US007026599B2

(12) United States Patent
Gombert

(10) Patent No.: US 7,026,599 B2
(45) Date of Patent: Apr. 11, 2006

(54) POSITION AND/OR MOVEMENT SENSOR WITH OVERLOAD PROTECTION

(75) Inventor: Bernd Gombert, Grafrath (DE)

(73) Assignee: 3DConnexion GmbH, Seefeld (DE)

( * ) Notice: Subject to any disclaimer, the term of this patent is extended or adjusted under 35 U.S.C. 154(b) by 313 days.

(21) Appl. No.: 10/676,912

(22) Filed: Oct. 1, 2003

(65) Prior Publication Data

US 2004/0129899 A1 Jul. 8, 2004

(30) Foreign Application Priority Data

Oct. 2, 2002 (DE) ................................ 102 46 031

(51) Int. Cl.
*H01J 40/14* (2006.01)

(52) U.S. Cl. ...................................... 250/221; 250/239

(58) Field of Classification Search ..................... None
See application file for complete search history.

(56) References Cited

U.S. PATENT DOCUMENTS 4,763,531 A 8/1988 Dietrich et al.
4,785,180 A 11/1988 Dietrich et al.
6,044,938 A * 4/2000 Yabusaki et al. ........ 188/106 F
2002/0056326 A1 5/2002 Gombert et al.

* cited by examiner

*Primary Examiner*—Que T. Le
(74) *Attorney, Agent, or Firm*—Harness, Dickey & Pierce, P.L.C.

(57) ABSTRACT

A position and/or movement sensor for measuring a position or movement of a first object relative to a second object comprises a measuring device including a first member coupled to the first object; a second member coupled to the second object; and one or more first spring elements coupled between the first and second members; one or more stop members for limiting movement of the first member relative to the second member in at least one linear direction and/or about at least one pivot axis; and one or more second spring elements coupled between the first member and the first object. A spring constant of the second spring elements is greater than a spring constant of the first spring elements in at least one linear direction or about at least one pivot axis.

17 Claims, 3 Drawing Sheets

POSITION AND/OR MOVEMENT SENSOR WITH OVERLOAD PROTECTION

The present invention relates to a position and/or movement sensor for measuring a relative position or relative movement of a first object and a second object. The invention further relates to a force and/or torque sensor which utilizes such a position and/or movement sensor.

BACKGROUND OF THE INVENTION

EP 0 240 023 B1 discloses an optoelectronic arrangement which is capable of detecting relative linear movement or relative positions along axes of a Cartesian coordinate system, as well as rotational movement about these axes. To this end, six light-emitting elements spaced at identical angular distances from one another are disposed within a plastic ball. A stationary slit diaphragm is disposed in front of each light-emitting element. Relative movements and relative positions are detected by light-sensitive detectors arranged so, as to be movable with respect to the light-emitting elements and slit diaphragms.

From DE 100 34 569 A1 a device for detecting relative movement of two objects is known which employs an optoelectronic arrangement as disclosed in EP 0 240 023 B1. The device is particularly suited for industrial applications where high forces and torque occur. For this purpose, the detection device is provided, between an inlet and outlet flange, with an intermediate member made from an elastomer or cast resin in addition to an arrangement of helical springs. In this way, the device can accommodate particularly high forces and torque.

Further, DE 36 11 336 C2 discloses a force and torque sensor which measures all six possible force and torque components in a Cartesian coordinate system by means of strain gauges. The apparatus consists of two spoked wheels arranged above one another with four spokes each and a total of twenty mutually wired strain gauges.

Conventional sensors such as above exhibit a drawback in that their measurement range is limited. If the sensor is loaded beyond this measurement range, damage may occur to the sensor. In the sensor of EP 0 240 023 B1, for example, the light-sensitive detectors may come in contact with the light-emitting elements or the slit diaphragms upon too large a deflection and thus bring the whole arrangement out of adjustment or render it entirely useless. In the sensor of DE 36 11 336 C2, overstretching of the strain gauges or failure of the spokes may occur.

Generally, it can not be ensured that the extent of relative movement of two objects is always smaller than the measurement range of the sensor. In fact, in numerous applications, it may occur from time to time that the measurement range of the sensor is exceeded. Then, it may become necessary to replace the sensor with a new one if the old one is destroyed or becomes maladjusted or inoperative due to an excessive relative displacement of the objects, in order to ensure that subsequent measurements are reliable and correct. The replacement of a sensor is often cumbersome and involves immediate costs. Additionally, if the sensor plays a central role in, e.g., a production facility and production has, to be halted until the sensor is replaced, considerable secondary costs may occur.

Thus, there is a desire for a position and/or movement sensor that is less susceptible to damage or mal-function if the measurement range of the sensor is exceeded. There is also a desire for a force and/or torque sensor that is likewise less susceptible to such damage or mal-function.

SUMMARY OF THE INVENTION

The present invention provides a position and/or movement-sensor for measuring a position or movement of a first object relative to a second object, the sensor comprising a measuring device including a first member coupled to the first object; a second member coupled to the second object; and a first spring arrangement including one or more first spring elements coupled between the first and second members; one or more stop members for limiting movement of the first member relative to the second member in at least one linear direction and/or about at least one pivot axis; and a second spring arrangement including one or more second spring elements coupled between the first member and the first object; wherein a spring constant of the second spring arrangement is greater than a spring constant of the first spring arrangement in at least one linear direction or about at least one pivot axis.

The present invention further provides a force and/or torque sensor incorporating the above sensor.

Starting from a rest position, a movement of the first object relative to the second object causes a movement of the first member relative to the second member due to the higher stiffness of the second spring arrangement compared with that of the first spring arrangement. The second member and the second object can be identical parts or different parts. The one or more stop members serve to limit the displacement of the first member relative to the second member to a predetermined range (measurement range of the measuring device). In this way, damage can be avoided that might occur to the sensor if a relative displacement of the first and second members beyond this range were possible. On the other hand, relative displacement of the first and second objects beyond the range of maximum relative movement of the first and second members can be accommodated, at least in part, by the second spring arrangement.

In the sensor of the present invention, a deflection of the first object relative to the second object leads to a displacement of the first member relative to the second member and will also cause a displacement of the first object relative to the first member owing to the resilient connection between the first object and the first member. The ratio of these displacements depends on the ratio of the spring constants of the first and second spring arrangements. Specifically, given a particular deflection of the first object relative to the second object, the relative deflection of the first and second members is reduced by a factor $$\left(\frac{K_m}{K_s}\right)+1$$

compared with the given deflection between the first and second objects (assuming a rigid connection between the second member and the second object). In the above mathematical term, $K_m$ is the spring-constant of the first spring arrangement and $K_s$ is the spring constant of the second spring arrangement. Thus, an overall measuring range of the sensor of the present invention (as defined by the maximum detectable relative displacement of the first and second objects) is larger by the same factor than the maximum relative displacement of the first and second members as allowed by the one or more stop members (i.e., the measurement range of the measuring device).

It is to be appreciated that the position and/or movement sensor according to the present invention, in addition to the first and second spring arrangements, may comprise various other spring and/or damping means. For example, spring and damping means such as disclosed in DE 100 34 569 A1, the content of which is hereby expressly incorporated by reference, may be coupled between the first and the second objects.

In one embodiment of the position and/or movement sensor of the present invention, the spring constant of the second spring arrangement is at least twice the spring constant of the first spring arrangement in the at least one linear direction or about the at least one pivot axis. A ratio of at least two between the spring constants of the first and second spring arrangements results in the above factor being no greater than 1.5. This corresponds to an overall measurement range of the sensor that is at most 1.5 times the measurement range of the measuring device (i.e., the maximum range of relative deflection of the first and second members). In particular, the spring constant of the second spring arrangement can be twice the spring constant of the first spring arrangement in all directions of linear deflection and about all axes of rotational deflection.

The one or stop members can comprise at least one stop bolt securely connected to one of the first and second members. In one embodiment, the stop-bolt is cylindrical and is made of metal or synthetic material. It can be fastened to the corresponding member by screwing, bonding, soldering or any other suitable means. Preferably, the stop bolt extends perpendicularly from the corresponding member towards the other member.

In an embodiment of the invention, the one or more stop members limit a parallel displacement of the first member relative to the second member in a direction which is essentially vertical to the longitudinal axis of the stop bolt. This is preferably realised by providing the member with which the stop bolt is not securely connected with an opening whose diameter is larger than the diameter of the stop bolt, and through which the stop bolt extends. The distance between the circumference of the bolt and the edge of the opening defines the range within which a parallel displacement is possible. The opening is preferably circular. If the first member is deflected vertically to the longitudinal direction of the stop bolt relative to the other member farther than by the permitted range, the stop bolt abuts the edge of the opening and thus limits the movement of both assemblies relative to one another.

In another embodiment of the invention the one or more stop members limit a parallel displacement of the first member relative to the second member in a direction which extends essentially parallel to the longitudinal axis of the stop bolt. This is preferably realised by an enlargement against which the member which is not securely connected with the stop bolt abuts, if said member is deflected beyond the permissible range relative to the other member. The stop bolt may extend through an opening in the member with which the bolt is not securely connected, and two enlargements are provided. The first enlargement is disposed at a portion of the stop bolt that lies between the first and second members. The second enlargement is disposed at a portion of the stop bolt which, when viewed from the first enlargement, lies on the opposite side of the member through whose opening the stop bolt extends. The distance of the enlargements from the latter member defines the range within which the first member can move in the respective direction along the longitudinal direction of the stop bolt relative to the second member.

In another embodiment of the invention the one or more stop members limit a rotation of the first member relative to the second member about an axis which extends essentially parallel to the longitudinal axis of the stop bolt. This, too, is preferably realized by means of an opening associated with one stop bolt in the other member which is not securely connected with the bolt, with at least two pairs of stop bolt/opening being provided. In one embodiment, at least three stop bolts are provided that can be arranged at regular angular intervals and extend perpendicularly from the member with which they are securely connected towards the other member. Each stop bolt is associated with an opening in the other member.

The one or more stop members can further limit a rotation of the first member relative to the second member about an axis which extends essentially vertically to the longitudinal axis of the stop bolt(s). This is preferably achieved by providing at least two stop bolts which comprise suitable enlargements.

At least one of the first and second members can comprise a printed circuit board. In this manner, the respective member can be conveniently equipped with components suited for determining relative movement of the first and second members, e.g., position-sensitive detectors, diaphragms, and light-emitting elements as well as control circuitry and the like, if necessary.

The one or more second spring elements coupled between the first object and the first member may comprise one or more of the following: helical spring (packet), moulded elastomer part, cast resin part. In particular, three or more second spring elements can be provided so as to be arranged in a regularly distributed angular pattern.

Likewise, the one or more first spring elements coupled between the first and second members may comprise one or more of the following: helical spring (packet), moulded elastomer part, cast resin part. There can be provided three or more first spring elements that are arranged at regular angular intervals. In addition, they preferably have the same spring constants.

Preferably, all second spring elements have the same spring constant and all first spring elements have the same spring constant. Nevertheless, a situation can be envisioned where one or more of the second spring elements have a spring constant that is different from that of one or more other second spring elements in at least one linear direction or about at least one rotational axis, and/or one or more of the first spring elements have a spring constant that is different from that of one or more other first spring elements in at least one linear direction or about at least one rotational axis.

At least one spring element of the first and second spring arrangements can comprise a helical spring whose opposite ends are securely connected by soldering with the first object and the first member, or with the first and second members, respectively. The helical spring can thus be loaded in all directions, i.e. thrust or compression forces, as well as forces transverse to the helical spring can be applied, without the helical spring moving in its seat or coming out of them. In another embodiment, at least one spring element of the first and second spring arrangements comprises a cylindrical elastomeric body that can be connected to the first and second members or the first member and first object by gluing.

Preferably, the measuring device of the inventive sensor can detect positions or movements is of the objects relative to one another in six degrees of freedom, i.e. translations in three spatial directions and rotations about these spatial directions. In one embodiment of the invention, the measuring device comprises six optoelectronic measuring cells whith three of these measuring cells being for measuring movements parallel to a plane defined by a printed circuit board of one of the first and second members, and the remaining three measuring cells being for measuring movements perpendicular to that plane. The optoelectronic measuring cells are preferably distributed along the circumference of a circle. For example, they can be arranged in pairs spaced at regular angular offsets. In one embodiment, measuring cells which measure movements in the above-mentioned plane are arranged in alternation with cells which measure movements perpendicular thereto.

Each optoelectronic measuring cell can comprise a position-sensitive detector arranged in the beam path of a light-emitting element as well as a slit diaphragm arranged in the beam path-of the light-emitting element between the light-emitting element and the position-sensitive detector. The detector axis of the position-sensitive detector is aligned vertically to a slit direction of the slit diaphragm. Thus, only a narrow light bar impinges on the position-sensitive detector arranged, downstream of the diaphragm. The slit diaphragms of the measuring cells which measure movements in the plane extend perpendicular to the plane, while the slit diaphragms of the measuring cells which measure movements perpendicular to the plane extend parallel to it. Particularly preferred, the light-emitting elements are infrared light-emitting diodes (ILED's) and the position-sensitive detectors are position-sensitive infrared detectors.

One of the light-emitting element, slit diaphragm, and detector in each cell will be movable relative to the other two. Then, the position of the narrow light bar on the position-sensitive detector depends on the position of the movable element relative to the two other elements. In this manner, it is possible to detect relative positions or relative movements. In a preferred embodiment, the slit diaphragms are arranged on one of the first and second members, and the position-sensitive detectors and the light-emitting elements are commonly arranged on the respective other member. This is advantageous in that all electronic components can be mounted on a single printed circuit board.

Every measuring cell can include a light-emitting element of its own. The light-emitting elements can be arranged such that each light-emitting element emits light in a radial direction toward a center point. The light travels across the center point and reaches a corresponding detector disposed diametrically to the respective light-emitting element. If every measuring cell has its own light-emitting element, the output signal of the corresponding position-sensitive detector can be used to regulate the current of the corresponding light-emitting element in such a manner as to subject each position-sensitive detector to the same constant light intensity. This is advantageous in that all measuring systems are widely unaffected by temperature and aging influences as well as contamination and component tolerances.

The present invention also concerns any combination of the above-discussed embodiments. The position and/or movement sensor according to the present invention can be employed in a force and/or torque sensor. Based on the deflection of the first object relative to the second object, corresponding values of the forces exerted by the first and second spring arrangements can be determined, taking into account the spring constants of the first and second spring arrangements.

An advantageous application of the position and/or movement sensor and the force and/or torque sensor of the present invention is in a device for manually inputting control signals such as, for example, a joystick used in computer games run on personal computers or playstations, but also for the control of working machines and transportation apparatus.

Hereinafter, the invention is explained in more detail in conjunction with the accompanying drawings.

DETAILED DESCRIPTION OF THE DRAWINGS

Figure 1:
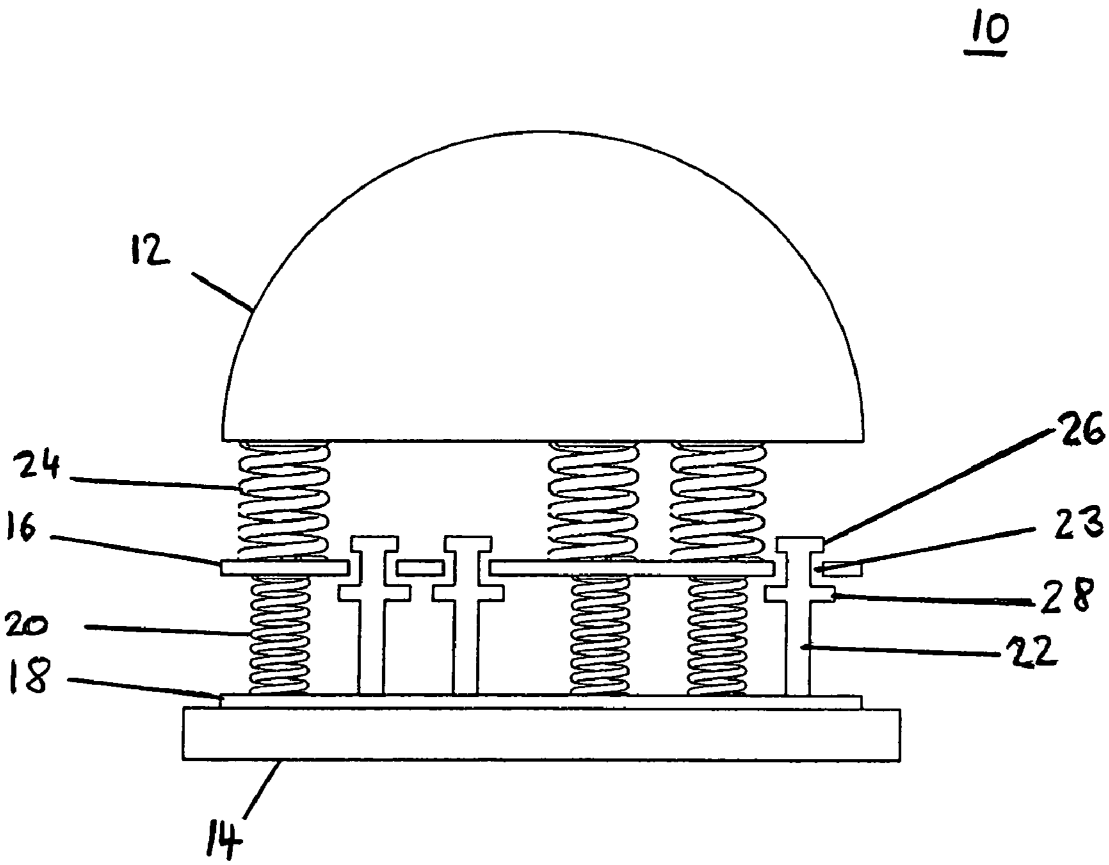
FIG. 1 is a side view of one embodiment of a position and/or movement sensor according to the present invention.

FIG. 1 depicts a position and/or movement sensor that allows to measure movement of a first object 12 relative to a second object 14. In the illustrated embodiment, the first object 12 is a half-spherical control member for manually inputting linear movements along three mutually orthogonal axes and pivotal (rotational) movements about three mutually orthogonal axes. The second object 14 is illustrated to be a base plate, which is securely connected to a housing (not shown) of the position and/or movement sensor. The sensor 10 further comprises a measuring device that includes a first member 16, a second member 18, and one or more first spring elements 20 (hereinafter referred to as measuring springs for sake of better understanding of the invention) coupled between the first and second members 16, 18 so as to provide a resilient connection therebetween. In the embodiment illustrated in FIG. 1, the members 16, 18 are plate members. They can be single parts or comprise an assembly of several component parts each. Relative movement of the first and second plate members 16, 18 is detected by means of an optoelectronic arrangement explained in detail hereinbelow.

The measuring device further comprises-one or more stop bolts 22 angularly spaced at regularly intervals about a center region of the sensor 10. In one embodiment, the stop bolts 22 may have a diameter of 5 mm and a length of 2 cm, for example. The stop bolts 22 serve to limit movement of the first plate member 16 relative to the second plate member 18. To this end, the stop bolts 22 extend through circular openings 23 formed in the first plate member 16. Given the above exemplary measurements of the stop bolts 22, the diameter of the openings 23 may, e.g., be 8 mm. Enlargements 26, 28 are formed on each of the stop bolts 22 above and below the openings 23.

The position and/or movement sensor 10 additionally comprises one or more second spring elements 24 (hereinafter referred to as protection springs) coupled between the first plate member 16 and the first object 12. The measuring springs 20 and the protection springs 24 are preferably helical springs, but can be any other type of resilient members providing spring action. An effective spring constant of the entirety of protection springs 24 is greater than a spring constant of the entirety of measuring springs 20 with respect to relative movement of the first and second plate members 16, 18 in at least one linear direction or about at least one rotation axis. Specifically, the relationship between the spring constant of the measuring springs 20 and that of the protection springs 24 is such that a displacement of the first object 12 relative to the second object 14 causes the first plate member 16 to be also deflected. Particularly, this relation can be so that when the first object 12 is deflected relative to the second object 14, the amount of deflection experienced by the first plate member 16 relative to the second plate member 18 is roughly the same as the amount of deflection imposed on the first object 12 relative to the second object 14.

However, in a situation where the first object 12 is overly deflected relative to the second object 14, the first plate member 16 abuttingly engages one or more of the stop bolts 22 at a stem portion thereof or at the enlargements 26, 28, depending on the direction of displacement of the first object 12, i.e., whether the first object 12 is deflected in a direction parallel or transverse to a longitudinal direction of the stop bolts 22. In this way, movement of the first plate member 16 relative to the second plate member 18 of the measuring device is limited. Limitation of the relative movement of the first and second plate members 16, 18 aids to prevent damage to, and possible destruction of, the measuring device as a result of too large a deflection. Further, a deflection of the first object 12 relative to the second object 14 beyond the point of abutting engagement of the first plate member 16 on the stop bolts 22 is accommodated by the protection springs 24. Note that the stop bolts 22 preferably limit relative movement of the first and second plate members 16, 18 in all directions of translatory movement and about all axes of rotational movement.

Figure 2:
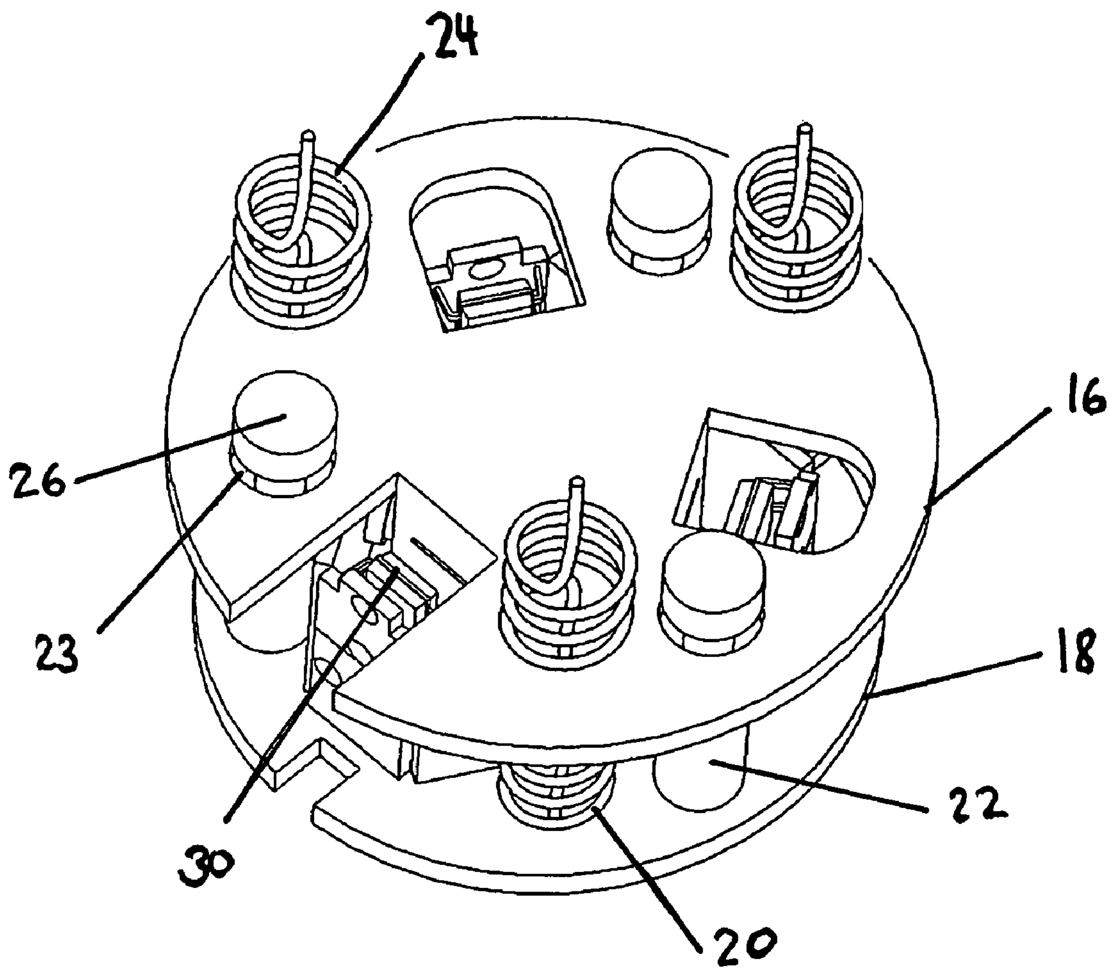
FIG. 2 shows a perspective view of a portion of the sensor of FIG. 1.

FIG. 2 is a perspective view of the measuring device, which includes the first plate member 16 and the second plate member 18, relative movements of which are measured by the measuring device. Specifically, the protection springs 24, which are connected to the first plate member 16, and the stop bolts 22, which are firmly connected to the second plate member 18, are illustrated in FIG. 2. At least one of the first and second plate members 16, 18 can be a printed circuit board. The springs 20, 24 can be soldered to the first and second plate members 16, 18. It can be seen in FIG. 2 that the springs 20, 24 are circumferentially distributed at regular intervals. The stop bolts 22 are screwed to the second plate member 18 and are likewise arranged at regular circumferential intervals.

The measuring device is capable of measuring relative movement or relative positions of the first and second plate members 16, 18 in six degrees of freedom, i.e., detect linear displacements in three mutually orthogonal directions and rotational displacements about three mutually orthogonal axes. To this end, a preferred embodiment of the sensor 10 comprises six position-sensitive infrared detectors 30, six infrared light-emitting diodes 32, and six slit diaphragms 34, which are particularly visible in FIG. 3. One each of the detectors 30, diodes 32 and diaphragms 34 together form a measuring cell. Thus, six measuring cells are provided altogether. The detectors 30 are arranged in pairs with the detectors in each pair being arranged one above another. Similarly, the diodes 32 are arranged in pairs with the diodes in each pair being arranged one above another. The pairs of detectors 30 and the pairs of diodes 32 are distributed at angular intervals of 120° about a center axis (not shown) that extends vertically to a plane defined by the second plate member 18. It can be seen in FIG. 3 that the pairs of detectors 30 and the pairs of diodes 32 are preferably arranged in alternation so that each pair of detectors faces an associated pair of diodes and is disposed diametrically thereto with respect to the before-mentioned vertical center axis. One of the detectors in each detector pair is for detecting movement in a vertical direction to the plane defined by the second plate member 18, whereas the other one of the detectors in each detector pair is for detecting movement along this plane.

Each slit diaphragm 34 is arranged in front of an associated one of the detectors 30 in a light beam path of an associated one of the diodes 32. The slit diaphragms 34 each comprise a narrow slit that allows only a narrow light bar to pass through the slit diaphragm and reach the corresponding detector 30. The direction of the slit is vertical to a detector axis of the corresponding detector, i.e., vertical to a measuring direction of the detector.

One of the detector 30, diode 32 and slit diaphragm 34 in each measuring cell is mounted to the first plate member 16, whereas the other two are mounted to the second plate member 18. In this way, one of the detector 30, diode 32 and slit diaphragm 34 is movable relative to the remaining two, allowing to detect relative movement or a relative position of the first and second plate members 16, 18. In one embodiment, it is the slit diaphragm 34 that is movable relative to the detector 30 and diode 32. For example, the detectors 30 and the diodes 32 can be mounted to the first plate member 16 and the slit diaphragm 34 can be mounted to the second plate member 18. Conversely, the detectors 30 and the diodes 32 can be mounted to the second plate member 18 and the slit diaphragms 34 can be mounted to the first plate member 16. In a preferred embodiment illustrated in FIG. 3, the diodes 32 are mounted to printed circuit boards 36, which are secured to the second plate member 18. The printed circuit boards 36 may include circuitry for driving the diodes 32 and receiving detection signals from the detectors 30. The printed circuit boards 36 are arranged so as to be vertical to the first plate member 18, i.e., parallel to the vertical central axis mentioned further above.

Figure 3:
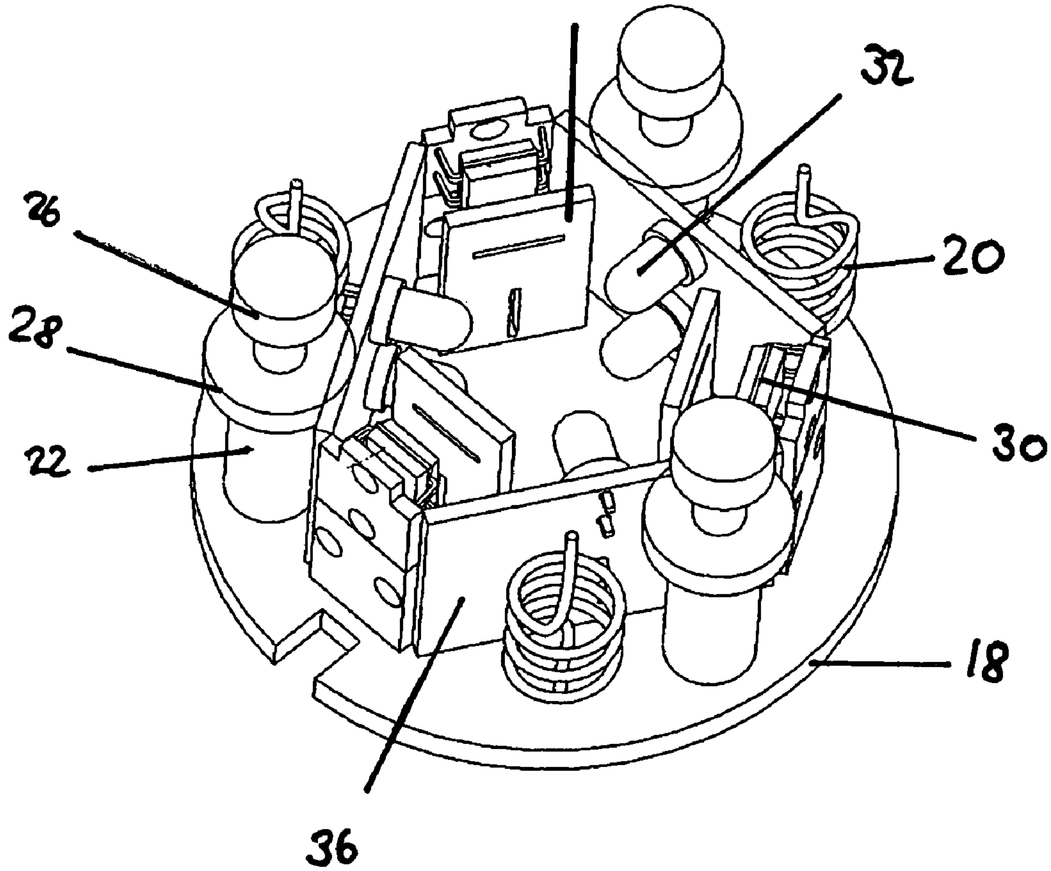
FIG. 3 shows a further perspective view of a portion of the sensor of FIG. 1.

Although the slit diaphragms 34 can be entirely separate from each other, in the embodiment depicted in FIG. 3 the slit diaphragms 34 are illustrated to be integrally formed in pairs, one in each pair having a horizontal slit and the other one having a vertical slit.

What is claimed is:

1. A position and/or movement sensor for measuring a position or movement of a first object relative to a second object, the sensor comprising:

- a measuring device including
  - a first member coupled to the first object;
  - a second member coupled to the second object; and
  - a first spring arrangement including one or more first spring elements coupled between the first and second members;
- one or more stop members for limiting movement of the first member relative to the second member in at least one linear direction and/or about at least one pivot axis; and
- a second spring arrangement including one or more second spring elements coupled between the first member and the first object;
- wherein a spring constant of the second spring arrangement is greater than a spring constant of the first spring arrangement in at least one linear direction or about at least one pivot axis.

2. The position and/or movement sensor of claim 1, wherein the spring constant of the second spring arrangement is at least double the spring constant of the first spring arrangement in the at least one linear direction or about the at least one pivot axis.

3. The position and/or movement sensor of claim 1, wherein the one or more stop members comprise at least one stop bolt securely connected to one of the first member and second member.

4. The position and/or movement sensor of claim 3, comprising a plurality of at least three stop bolts.

5. The position and/or movement sensor of claim 3, wherein the one or more stop members limit linear displacement of the first member relative to the second member in a direction perpendicular to a longitudinal axis of the stop bolt.

6. The position and/or movement sensor of claim 3, wherein the one or more stop members limit pivotal displacement of the first member relative to the second member about an axis extending essentially parallel to a longitudinal axis of the stop bolt.

7. The position and/or movement sensor of claim 3, wherein the one or more stop members limit linear displacement of the first member relative to the second member in a direction parallel to a longitudinal axis of the stop bolt.

8. The position and/or movement sensor of claim 3, wherein the one or more stop members limit pivotal displacement of the first member relative to the second member about an axis extending essentially perpendicular to a longitudinal axis of the stop bolt.

9. The position and/or movement sensor of claim 1, wherein at least one of the first and second members comprises a printed circuit board.

10. The position and/or movement sensor of claim 1, wherein the one or more second spring elements comprise one or more of the following: a helical spring, a moulded elastomeric member, a cast resin member.

11. The position and/or movement sensor of claim 1, wherein the one or more first spring elements comprise one or more of the following: a helical spring, a moulded elastomeric member, a cast resin member.

12. The position and/or movement sensor of claim 1, further comprising a plurality of optoelectronic measuring cells for detecting relative movement or position in six degrees of freedom.

13. The position and/or movement sensor of claim 12, wherein the measuring cells are angularly distributed about a center.

14. The position and/or movement sensor of claim 13, wherein the measuring cells are arranged in pairs with the measuring cells in each pair being disposed one above another, and wherein the pairs of measuring cells are arranged at regular intervals about the center.

15. The position and/or movement sensor of claim 12, wherein each measuring cell comprises:

a light-emitting member;

a position-sensitive detector disposed in a beam path of the light-emitting member; and a slit diaphragm disposed in the beam path between the light-emitting member and the position-sensitive detector;

wherein a detector axis of the position-sensitive detector is aligned vertically to a slit direction of the slit diaphragm, and wherein one of the light-emitting member, slit diaphragm, and detector is movable relative to the other two.

16. The position-and/or movement sensor of claim 15, wherein the slit diaphragm is arranged on one of the first and second members and the position-sensitive detector and the light-emitting member are arranged on the other one of the first and second members.

17. A force and/or torque sensor comprising a position and/or movement sensor of claim 1.

* * * * *